(12) United States Patent
Thorne

(10) Patent No.: US 7,774,137 B2
(45) Date of Patent: Aug. 10, 2010

(54) SPEED-MONITORING RADAR-ACTIVATED BRAKE LIGHT

(76) Inventor: Steve Thorne, 3315 Grand Ave., Oakland, CA (US) 94610

( * ) Notice: Subject to any disclaimer, the term of this patent is extended or adjusted under 35 U.S.C. 154(b) by 699 days.

(21) Appl. No.: 11/689,919

(22) Filed: Mar. 22, 2007

(65) Prior Publication Data

US 2007/0168129 A1 Jul. 19, 2007

Related U.S. Application Data

(63) Continuation-in-part of application No. 11/610,039, filed on Dec. 13, 2006, now Pat. No. 7,319,932, which is a continuation-in-part of application No. 10/602,451, filed on Jun. 24, 2003, now Pat. No. 7,162,369.

(51) Int. Cl.
*B60T 7/12* (2006.01)
(52) U.S. Cl. .................. 701/301; 701/300; 701/96
(58) Field of Classification Search .......... 701/300–302, 701/96, 93; 340/901, 903, 435–436
See application file for complete search history.

(56) References Cited

U.S. PATENT DOCUMENTS

| | | | |
|---|---|---|---|
| 2,851,120 A | 9/1958 | Fogiel | |
| 3,710,383 A | 1/1973 | Cherry et al. | |
| 3,778,826 A | 12/1973 | Flannery et al. | |
| 3,850,041 A | 11/1974 | Seaman | |
| 3,898,652 A | 8/1975 | Rashid | |
| 3,984,836 A | 10/1976 | Oishi et al. | |
| 4,621,705 A | 11/1986 | Etoh | |
| 5,014,200 A | 5/1991 | Chundrlik et al. | |
| 5,357,438 A | 10/1994 | Davidian | |
| 5,369,591 A | 11/1994 | Broxmeyer | |
| 5,381,338 A | 1/1995 | Wysocki et al. | |
| 5,463,370 A | 10/1995 | Ishikawa et al. | |
| 5,504,472 A | 4/1996 | Wilson | |
| 5,594,415 A | 1/1997 | Ishikawa et al. | |
| 5,865,265 A | 2/1999 | Matsumoto | |
| 6,032,097 A | 2/2000 | Iihoshi et al. | |
| 6,268,793 B1 * | 7/2001 | Rossi | 340/471 |
| 6,278,360 B1 * | 8/2001 | Yanagi | 340/436 |
| 6,420,996 B1 | 7/2002 | Stopczynski et al. | |
| 6,487,500 B2 | 11/2002 | Lemelson et al. | |
| 6,597,981 B2 | 7/2003 | Nishira et al. | |

OTHER PUBLICATIONS

Notice of Allowance for U.S. Appl. No. 11/610,039 mailed on Oct. 19, 2007.

* cited by examiner

*Primary Examiner*—Yonel Beaulieu
(74) *Attorney, Agent, or Firm*—James F. Hann; Haynes Beffel & Wolfeld

(57) ABSTRACT

The operator of a third vehicle trailing a second, host vehicle is alerted of a potentially hazardous deceleration of a first vehicle forward of the host vehicle. The road-speed of the first vehicle is ascertained by the host vehicle. Any significant deceleration of the road-speed of the first vehicle is determined. A luminous signal is provided to the third vehicle by the host vehicle when such significant deceleration has occurred. According to some methods a radar device carried by the host vehicle may be used to determine the relative speed between the first and second vehicles.

8 Claims, 1 Drawing Sheet

SPEED-MONITORING RADAR-ACTIVATED BRAKE LIGHT

CROSS REFERENCE TO OTHER APPLICATIONS

This application is a continuation in part of U.S. patent application Ser. No. 11/610,039 filed 13 Dec. 2006, now U.S. Pat. No. 7,319,932; which is a continuation of U.S. application Ser. No. 10/602,451 filed 24 Jun. 2003, and now U.S. Pat. No. 7,162,369.

FIELD OF THE INVENTION

This invention relates to the fields of vehicular flow, radar devices, and alert mechanisms. Specifically, this invention relates to devices used to alert the driver of a moving vehicle of sudden changes in traffic speed for the purpose of reducing the likelihood of a collision.

BACKGROUND AND PRIOR ART

Each year in the United States, rear-end vehicular collisions cause over $18 billion dollars in property damage, cause over 1 million injuries, and over 4000 deaths. The major reason for such collisions is that vehicles travel at separation distances too short to allow sufficient braking time when forward traffic suddenly slows. With the higher percentage of larger vehicles on the roadways, clear view of the road has been increasingly obstructed—further reducing the time a driver has to react to sudden reductions in traffic speed.

There have been many devices in the prior art that have been proposed to reduce the risk of collision. Many of these ideas involve the use of radar. One of the earliest uses of radar to assist with vehicle safety was described in U.S. Pat. No. 2,851,120 issued to Fogiel back in September of 1958, wherein a range finder and calculating device determines a safe traveling distance for the vehicle and applies automatic braking when vehicles move within that range. Numerous subsequent patents such as U.S. Pat. No. 3,898,652 issued August 1975 to Rashid, U.S. Pat. No. 3,710,383 issued January 1973 to Cherry et al and U.S. Pat. No. 3,778,826 issued December 1973 to Flannery et al also combine radar with automatic braking mechanisms. U.S. Pat. No. 5,381,338 issued to Wysocki et al in 1995 and U.S. Pat. No. 6,487,500 issued to Lemelson and Pedersen in November 2002 describe inventions utilizing the global positioning system together with inter-vehicle communications to monitor traffic flow and, in the case of Lemelson and Pedersen, initiate an automatic controlled braking of the vehicle.

U.S. Pat. No. 5,014,200 issued May 1991 to Chundrlik et al and assigned to General Motors Corp., and U.S. Pat. No. 4,621,705 issued November 1986 to Etoh and assigned to Nissan Motor Company each involve systems utilizing radar for automatically controlling vehicle speeds to maintain safe vehicle separation.

Numerous patents involve systems that provide the driver of the vehicle with information about the safe stopping distances between vehicles and other objects. These include U.S. Pat. No. 3,984,836 issued October 1976 to Oishi et al wherein relative distance separations are indicated on an instrument panel, and U.S. Pat. No. 3,850,041 issued November 1974 to Seaman wherein a light beam projected forward of the vehicle indicates the required safe stopping distance. U.S. Pat. No. 5,357,438 issued October 1994 issued to Davidian describes a device which includes a speed sensor, a space sensor, and a control panel with means to input parameters concerning the vehicle, the condition of the road, the daylight condition, and even a 'condition-of-driver' parameter each used to help calculate a 'danger-of-collision distance' to nearby objects.

And U.S. Pat. No. 5,369,591 issued to Broxmeyer in 1994 describes a system for 'longitudinal control and collision avoidance' wherein magnets are embedded in both the roadway and the vehicle with position sensors broadcasting by radio the vehicle's position to local receiving stations and then receiving, in return, an audio feedback command for directions for safe maneuvering.

U.S. Pat. No. 5,504,472 issued to Wilson describes a device that monitors the pressure a driver applies to their brake pedal, and a when a high value is detected, flashes the vehicle's brake light to warn trailing drivers.

Each of the above mentioned patents—together with numerous other patent variations not listed above—may be successful in meeting their stated objects to some degree. However, none has yet to be successfully integrated into today's vehicles and roadways to any significant extent because they either involve technology that is too complicated, or propose implementing systems that are not financially viable for society at this time, or are systems which are activated by the wrong parameter. In the patent issued to Davidian, for example, a 'danger-of collision distance' parameter is used and when the measured distance of an object is equal to or less than this value, a collision alarm is activated. The fallacy in using distance as a parameter for activating an alarm is that the traffic patterns vary so frequently when driving that it becomes a useless parameter to monitor. For instance, when a safe 'danger-of-collision distance' is computed for a vehicle traveling at 60 miles per hour, the value may be useful to apply when a vehicle is traveling down a sparsely traveled highway—for the alarm will notify the driver when an object is closer than this distance—however, when the same vehicle then encounters a dense traffic pattern the distance separating vehicles may always be shorter than the 'danger-of-collision' distance in which case the alarm will always be activated. The system then fails to be able to provide any new information when a sudden speed change occurs. When vehicles are traveling almost bumper-to-bumper at full highway speed, then it becomes even more imperative that the speed change be the deciding parameter to convey to a trailing vehicle-not the distance. If, alternatively, the 'danger-of-collision' distance is set to a shortened value for dense traffic, then the moment the traffic opens up, the shortened distance will no longer give warnings about speed changes beyond that distance proving to be a liability to the driver expecting a warning. Another problem with using distance as the deciding parameter to activate a warning is that consecutive vehicles may be adjusting their speeds at the same rate in which case their relative separations may remain constant-masking the fact that the forward traffic is also slowing.

In summary, the danger from collisions on the roadways has not been alleviated by any of these prior art inventions. Ironically, despite the plethora of innovative ideas within the patent records, the best mechanism which exists today for alerting a driver of changes in the forward traffic flow are(is) the standard brake lights found on all vehicles-and this prior art feature has been incorporated into vehicles for over 80 years.

The prior art in brake lights, however, has four inherent deficiencies that can contribute to the problem of vehicular collision. First, they require the driver of the vehicle to observe the sudden change in speed in the forward vehicle. If the driver is not paying attention to the roadway, or does not have good visibility of the forward roadway, then they may not apply the brakes—and activate the vehicle's brake light—until much of the free space forward of the vehicle has been traversed. Secondly, the driver must use their judgment to decide whether the traffic speed change warrants applying their brake. Often a driver's judgment is incorrect and the brake lights are not activated until a collision becomes imminent. Thirdly, there can be a loss of a half-second or more due to the reaction time between the instant when even an alert driver recognizes a change in speed in the forward vehicle and the moment when the driver actually applies the brake activating their brake light. And fourthly, frequently the driver of a vehicle may be resting their foot on the brake pedal or lightly applying the brake and falsely indicating to the driver of a trailing vehicle of a reduction in speed-and eliminating the opportunity to later initiate a meaningful braking warning.

Although it is the speed changes that are most important to a driver, there existed no viable alternative to the operator-initiated prior art brake light for communicating information about the speed of a forward vehicle to the driver of a trailing vehicle until U.S. Pat. No. 7,162,369 issued to Thorne in January 2007 titled: SPEED-MONITORING RADAR-ACTIVATED BRAKE LIGHT.

Thorne teaches incorporating a radar device into a host vehicle that monitors the speed of a forward vehicle and automatically alerts the driver of a trailing vehicle when that forward vehicle decelerates. Because that device operates automatically without dependence on the driver's level of attentiveness or the speed of their reactions, it alerts trailing drivers of the need to brake at least a half-second sooner than any prior art brake light device. At freeway speeds, that typically gives trailing drivers an extra fifty feet to avoid a collision.

Accordingly, one or more examples of the invention have one or more of the following objectives, features and advantages:

(a) to provide a radar-activated, speed-monitoring device, integral with a host vehicle;

(b) to provide an improved method for enjoining a radar-activated, speed-monitoring device with existing prior art brake lights and a modified way for activating those lights such that trailing drivers can be alerted to potentially hazardous changes in vehicles forward of the host vehicle;

(c) to provide an improved method for enjoining a radar-activated, speed-monitoring device with a new dual acting form of brake light and a modified way for activating those lights such that trailing drivers can be alerted to potentially hazardous speed changes in vehicles forward of the host vehicle;

(d) to provide an improved method for a warning signal which can better capture the attention of trailing drivers to potentially hazardous speed changes in vehicles forward of the host vehicle;

(e) to provide a method whereby a radar-activated, speed-monitoring device can convey the rate of deceleration in the warning signal provided to a trailing driver;

(f) to teach how such a speed-monitoring radar-activated brake light can be uniquely incorporated into existing vehicles without major alteration to a vehicle's existing brake light system.

Further features and advantages of this invention will become apparent from a consideration of the drawings and the ensuing description.

SUMMARY OF THE INVENTION

According to one example of the invention, the operator of a third, trailing vehicle is alerted of a potentially hazardous deceleration of a first, leading vehicle forward of a second, host vehicle. The road-speed of the first vehicle is continuously ascertained and monitored by the host vehicle. When any significant deceleration of the road-speed of the first vehicle is determined, a luminous signal is provided to the third vehicle by the host vehicle indicating that a significant deceleration has occurred. According to some methods a radar device carried by the host vehicle may be used to determine the relative speed between the first and host vehicles.

Figure 1:
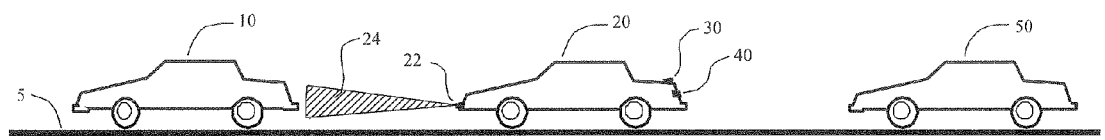
FIG. 1 is an elevational view of a radar-activated, speed-monitoring device incorporated into a host vehicle positioned on a roadway traveling between two other vehicles.

REFERENCE NUMERALS USED IN THE DRAWINGS 5 roadway
10 forward vehicle
20 host vehicle
22 front radar
24 front radar signal
28 CPU
30 luminous display
31 first display element
32 second display element
40 prior art brake lights
50 trailing vehicle

DETAILED DESCRIPTION OF EXAMPLES OF THE INVENTION

FIG. 1 shows an example of the invention incorporated into host vehicle 20 positioned on roadway 5. Front radar 22 reflects front radar signal 24 off forward vehicle 10 to ascertain the speed of forward vehicle 10 relative to host vehicle 20. To distinguish between the event where the speed of forward vehicle 10 remains constant and host vehicle 20 accelerates from the event where the speed of host vehicle 20 remains constant but forward vehicle 10 decelerates, the speed of forward vehicle 10 relative to the road must be derived. The speed of forward vehicle 10 relative to the road, called the road-speed, can be ascertained by applying the formula:

(road-speed)=(radar gathered relative speed)+(speed of host vehicle).

The speed of host vehicle 20 can be obtained either by electronic connection to the host vehicle's speedometer or, for example, by incorporating a GPS receiver capable of giving real time rates of position change. Accordingly, with the integration of CPU 28 to compute and monitor the derived speed of forward vehicle 10 relative to the road, significant, potentially hazardous decelerations can be uniquely identified. By activation of a luminous display 30 or both luminous display 30 and prior art brake lights 40, a warning, in the form of a luminous signal, that a significant deceleration has occurred can be provided to the driver of trailing vehicle 50. Luminous display 30 is of sufficient brightness and is so positioned on host vehicle 20 to be visible to the driver of trailing vehicle 50. Luminous display 30 can be, for example, a single light different in color from prior art brake lights 40, a series of lights with different colors or brightness to indicate different hazardous conditions, or a lighted display screen capable of conveying a text message.

Figure 3A:
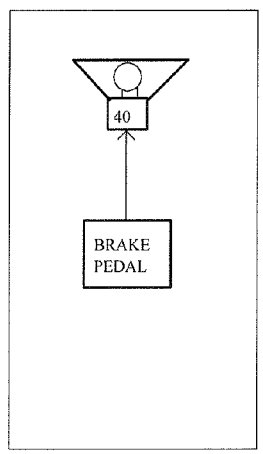
FIG. 3A is a diagram showing the control schematic for existing brake lights.
Figure 3B:
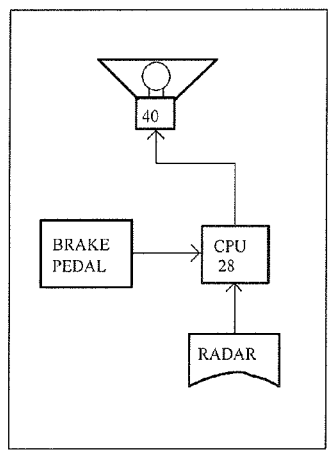
FIG. 3B is a diagram showing the control schematic for modified control of existing brake lights.

FIG. 3A shows how the control of prior art brake lights 40 is governed completely by the status of a vehicle's brake pedal; when a driver depresses their brake pedal, an electrical connection activates the brake light. FIG. 3B shows how prior art brake lights can be used to function as the luminous display 30 without any modification to the light itself. By passing the 'brake pedal depressed' signal first through the CPU that is simultaneously monitoring data from front radar 22, activation of prior art brake lights 40 can be controlled to convey greater information. In the simplest application, prior art brake lights 40 can be activated by CPU 28 when either the brake pedal has been depressed or when CPU 28 has detected the deceleration of forward vehicle 10. Optionally, independent of the status of the brake pedal, prior art brake lights 40 might be directed by CPU 28 to flash on and off if a rapid deceleration of forward vehicle 10 is detected. Thus, under a braking event where host vehicle 20 is braking, and prior art brake lights 40 are activated, and the subsequent deceleration of forward vehicle 10 is detected, the driver of trailing vehicle 50 can still be alerted of this hazard by CPU 28 controlled flashing of the light. Such a safety feature is not possible with conventional brake lights.

Figure 2A:
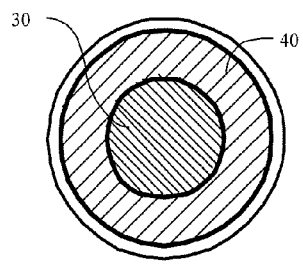
FIGS. 2A and 2B are elevational views of different embodiments of the luminous display element of the invention as enjoined with prior art brake lights.
Figure 3C:
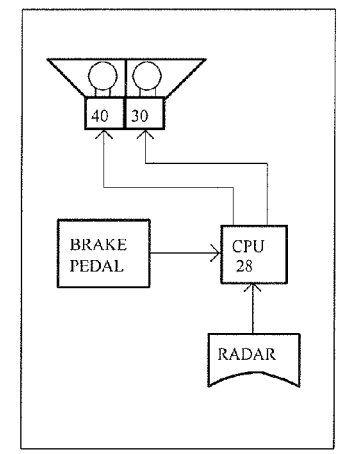
FIG. 3C is a diagram showing the control schematic for modified control of a preferred dual brake light.

FIG. 2A shows a configuration illustrating the integration of luminous display 30 with prior art brake lights 40 that requires only minor design modification to the form of prior art lights but which can provide distinguishable information about the braking status of both host vehicle 20 and forward vehicle 10. Critically, in this dual configuration, both luminous display 30 and prior art brake lights 40 can be to fit into the same space currently allocated just for prior art brake lights. Each light can be made red in color, or optionally, slight variations in red, to conform to current regulations governing vehicle lighting. FIG. 3C shows how control of the dual brake light can be integrated with CPU 28.

When such a dual brake light is incorporated into host vehicle 20, then, under typical driving conditions where forward vehicle 10 slows first, the driver of trailing vehicle 50 will observe the radar controlled luminous display 30 portion of the light activated then the prior art brake lights 40 portion shortly thereafter. One advantage of this dual configuration is that without shifting one's attention to different locations on host vehicle 10, the trailing driver learns of the braking status two cars ahead of them instead of just one. Further, because drivers associate red with stopping, the activation of either portion of the light will alert the driver of the need to brake. And further, because luminous display 30 is instantly and automatically activated, the driver learns of that need to brake at the earliest possible moment. With such a dual configuration, rapid decelerations can also be conveyed by CPU 28 alternately flashing luminous display 30 with prior art brake lights 40, or in some other manner.

Figure 2B:
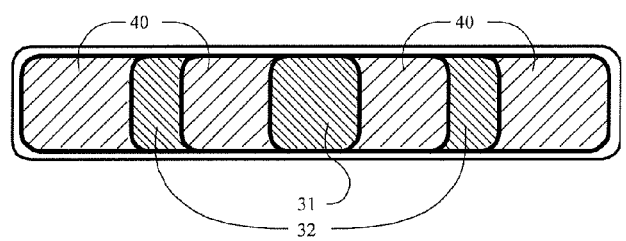

FIG. 2B shows another configuration of the dual brake light illustrating the integration of the radar activated CPU 28 controlled first display element 31 and radar activated CPU 28 controlled second display element 32 with prior art brake lights 40. The operation of this dual configured brake light is similar to the operation of the light of FIG. 2A, but incorporating multiple display elements separated spatially allows for the further conveyance of information about the magnitude of the deceleration of forward vehicle 10. Thus, for a slow rate of deceleration, only first display element 31 might be illuminated and for a faster deceleration rate second display element 32 might also be illuminated. For the most rapid decelerations, CPU 28 optionally can alternately flash first display element 31, second display element 32 and prior art brake lights 40 producing the greatest possible visual warning. Other methods for providing information on the degree of deceleration can also be used.

Automobile manufacturers may opt to modify just the upper middle prior art brake light into this dual configuration, or they may find it most productive incorporating it into just the two lower lights, or optionally in all three locations.

RAMIFICATIONS OF THE INVENTION

The reader will see that when a vehicle's brake lights are controlled not singly by depression of the vehicle's brake pedal, but by CPU 28 incorporating data gathered by a speed-monitoring front radar 22, the driver of trailing vehicle 50 can be alerted to the speed changes in a manner not presently available in prior art systems. Specifically, they can be alerted to the speed changes two vehicles forward of their vehicle rather than only one that prior art brake lights 40 provide and optionally in a manner that allows for the conveyance of information about the magnitude of those speed changes.

This is especially important when either the size of host vehicle 20 is large and obscures most of the trailing driver's view to the forward roadway or when weather conditions decrease visibility such that a driver cannot see further forward than to the rear of the vehicle directly in front. When traveling on crowded roadways, occupants within a vehicle equipped with this invention are safer than occupants within the same vehicle not equipped with this invention because the driver of a trailing vehicle will be better informed of forward speed reductions. It can be seen that integration of CPU 28 means of controlling a vehicle's brake light works independently of the actions of the driver of host vehicle 20, and thus its operating efficiency is not affected by the attentiveness, the judgment, or the reaction time of said driver.

Further, it can be seen that integration of CPU 28 means of controlling a vehicle's brake light works independently of the need for any other mechanism placed on other vehicles or along the roadways, and therefore can be implemented without universal changes to all vehicles or large expenditures modifying the roadways. And because this invention can operate independently of mechanisms external to host vehicle 20, it is not prone to system failures that often occur in interdependent mechanisms.

Although the description above contains much specificity, it should not be construed as limiting the scope of the invention but as merely providing illustrations of the presently preferred embodiment of this invention. Accordingly, the scope of the invention should be determined not by the embodiments illustrated, but by the appended claims and their legal equivalents.

Any and all patents, patent applications and printed publications referred to above are incorporated by reference.

I claim:

1. A method for automatically alerting the operator of a third vehicle trailing a second, host vehicle of a potentially hazardous deceleration of a first vehicle forward of said host vehicle, the method comprising:

ascertaining the road-speed of the first vehicle by the host vehicle;

determining when a significant deceleration of the road-speed of the first vehicle occurs; and providing a luminous signal to the third vehicle by the host vehicle when said significant deceleration has occurred.

2. The method according to claim 1 wherein the ascertaining step is carried out using a radar device carried by the host vehicle to determine the relative speed between the first and host vehicles, and means, carried by said host vehicle, for determining the road speed of the host vehicle.

3. The method according to claim 1 wherein the luminous signal providing step is carried out using a luminous display mounted to a rear portion of said host vehicle, the luminous display being sufficiently bright and so positioned to be visible by an operator of the third vehicle.

4. The method according to claim 1 wherein the luminous signal providing step comprises displaying a text message on a lighted display.

5. The method according to claim 1 wherein the luminous signal providing step is carried out using said host vehicle having a brake light and a luminous display spaced apart from one another, the luminous display creating said luminous signal.

6. The method according to claim 1 wherein the luminous signal providing step is carried out to indicate different hazardous conditions.

7. The method according to claim 1 wherein the luminous signal providing step is carried out by providing a luminous first vehicle decelerating signal to the third vehicle by the host vehicle only when said significant deceleration has occurred.

8. The method according to claim 1 wherein the luminous signal providing step comprises providing a flashing luminous signal to the third vehicle by the host vehicle when said significant deceleration has occurred.

* * * * *